(12) United States Patent
Miller

(10) Patent No.: US 6,364,277 B1
(45) Date of Patent: Apr. 2, 2002

(54) ARMATURE ASSEMBLY SUPPORT PALLET

(75) Inventor: Danny L. Miller, Union, OH (US)

(73) Assignee: Globe Products Inc., Huber Heights, OH (US)

( * ) Notice: Subject to any disclaimer, the term of this patent is extended or adjusted under 35 U.S.C. 154(b) by 156 days.

(21) Appl. No.: 08/529,187

(22) Filed: Sep. 15, 1995

(51) Int. Cl.$^7$ .......................... F16M 1/00; B65G 37/00; B23Q 3/00
(52) U.S. Cl. .................. 248/676; 198/803.01; 269/296
(58) Field of Search ................. 248/676, 678, 248/675, 146, 346.06, 769; 296/296, 902, 298, 299, 293; 266/274; 198/803.6, 867.04; 211/DIG. 1

(56) References Cited

U.S. PATENT DOCUMENTS

| | | | | |
|---|---|---|---|---|
| 3,830,488 A | * | 8/1974 | Wilger et al. ................ | 269/296 |
| 3,920,129 A | | 11/1975 | le Vasseur ...................... | 214/1 |
| 4,012,834 A | | 3/1977 | le Vasseur .................... | 29/597 |
| 4,033,531 A | * | 7/1977 | Levine ......................... | 248/676 |
| 4,081,072 A | | 3/1978 | le Vasseur .................. | 198/394 |
| 4,121,814 A | * | 10/1978 | Prior ........................... | 269/296 |
| 4,306,646 A | | 12/1981 | Magni ......................... | 198/341 |
| RE31,945 E | | 7/1985 | Magni ......................... | 198/341 |
| 4,982,827 A | | 1/1991 | Seitz et al. .................. | 198/341 |
| 4,984,353 A | | 1/1991 | Santandrea et al. ........... | 29/714 |
| 5,060,780 A | | 10/1991 | Santandrea et al. ...... | 198/345.1 |
| 5,060,781 A | | 10/1991 | Santandrea et al. ...... | 198/345.1 |
| 5,099,978 A | | 3/1992 | Santandrea et al. ...... | 198/345.1 |
| 5,115,901 A | | 5/1992 | Santandrea et al. ...... | 198/345.3 |
| 5,131,161 A | * | 7/1992 | Drag ........................... | 33/533 |
| 5,145,052 A | | 9/1992 | Santandrea et al. ...... | 198/468.2 |
| 5,255,778 A | | 10/1993 | Santandrea et al. .... | 198/803.11 |
| 5,255,800 A | | 10/1993 | Kelly .......................... | 211/89 |
| 5,257,689 A | | 11/1993 | Lombard et al. ......... | 198/468.2 |
| 5,346,058 A | | 9/1994 | Santandrea et al. .... | 198/803.01 |
| 5,348,142 A | * | 9/1994 | Nishimura et al. .... | 198/867.08 |
| 5,443,643 A | | 8/1995 | Cardini et al. .............. | 118/712 |
| 5,464,187 A | * | 11/1995 | Linkner, Jr. .................. | 248/675 |
| 5,474,166 A | | 12/1995 | Santandrea et al. ...... | 198/345.3 |
| 5,529,391 A | * | 6/1996 | Egigian ...................... | 296/164 |
| 5,685,413 A | * | 11/1997 | McGough .............. | 198/803.01 |
| 6,098,974 A | * | 8/2000 | Dolgas et al. .............. | 269/296 |

FOREIGN PATENT DOCUMENTS

GB    2 186 249 B    11/1989

OTHER PUBLICATIONS

Front & Rear Covers and p. 23 of Catalog Published By Enco Manufacturing Company, Chicago, IL, 1979.
See Accompanying Information Disclosure Statement Regarding Prior Art Adjustable Pallet.
Globe Products Inc. Drawing No. M95765–4, Dated Mar. 1, 1993, and Admitted to be Prior Art.

* cited by examiner

Primary Examiner—Anita King
(74) Attorney, Agent, or Firm—Roger S. Dybvig

(57) ABSTRACT

An armature assembly support pallet has armature assembly support surfaces which exhibit a magnetic field that magnetizes the portions of the armature shaft adjacent the support surfaces so that armature assembly is magnetically attracted to the support surfaces and thereby maintained in a precise axial position on the pallet as the pallet is conveyed between work stations. The magnetic field is preferably created by thin layers of magnetic material secured to upwardly-facing surfaces of V-shaped portions of support members or blocks affixed to the body of the pallet. The pallets may be used without changes or adjustments for supporting armature assemblies having a substantial range of various different configurations. Pallets of known construction, including those with adjustable support members, may be modified or retrofitted by providing them with magnetic support surfaces.

8 Claims, 3 Drawing Sheets

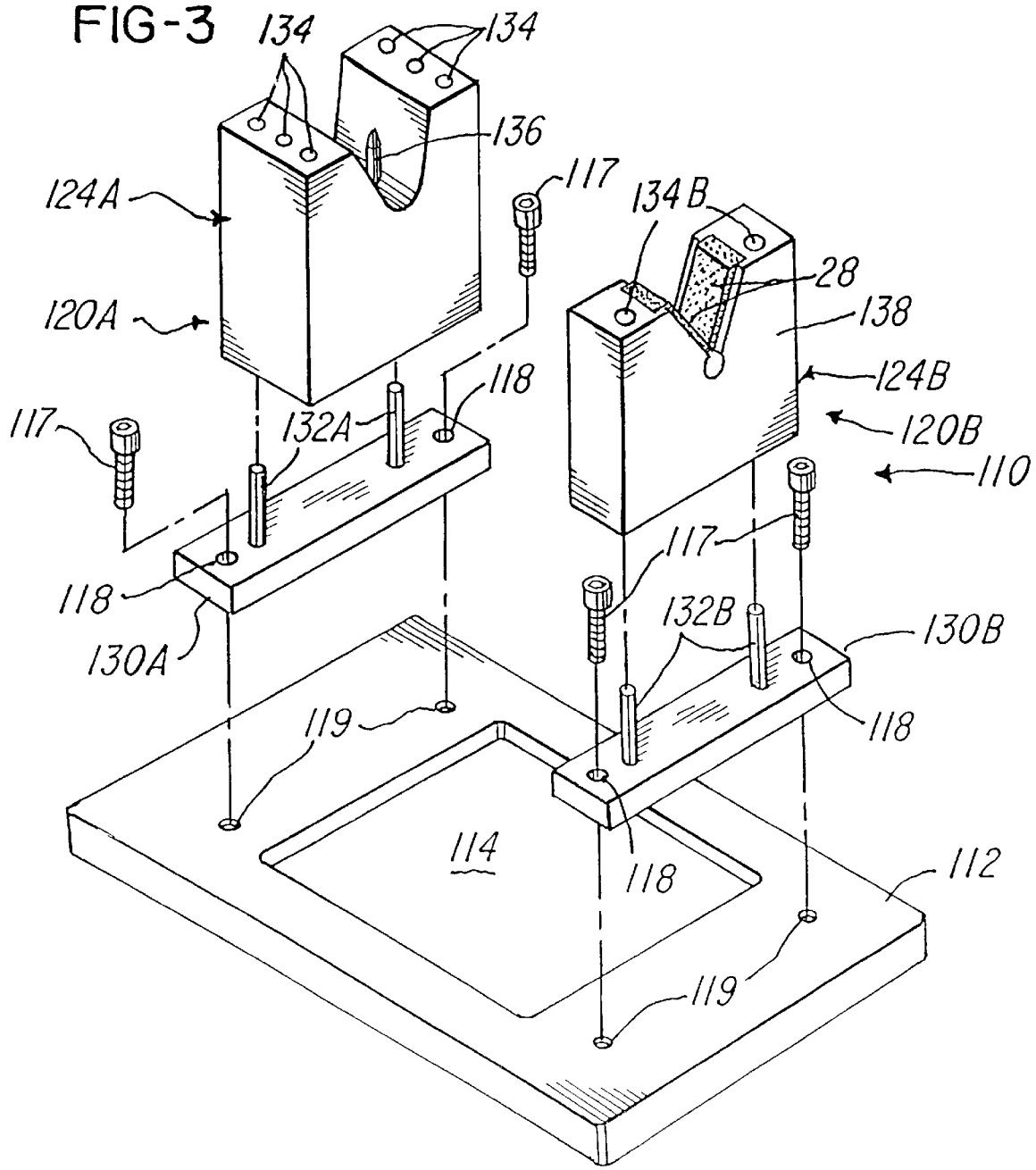

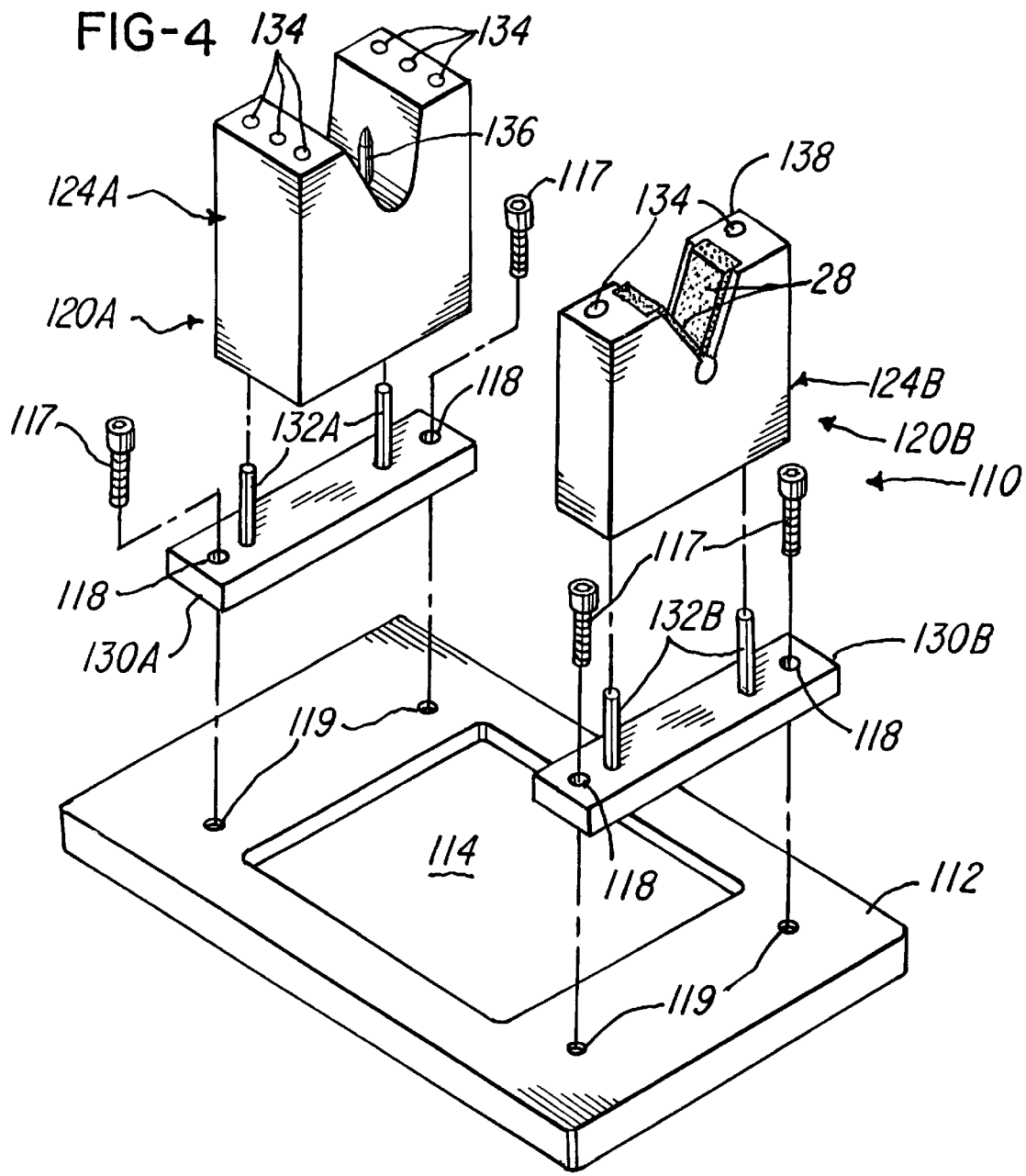

ARMATURE ASSEMBLY SUPPORT PALLET

FIELD OF THE INVENTION

This invention relates to an armature assembly support pallet used for conveying a partly constructed electric motor armature assembly during manufacture.

BACKGROUND OF THE INVENTION

During manufacture of electric motor armature assemblies having cores made from a stack of laminations, partially manufactured armature assemblies may be supported on support pallets conveyed by a conveyor between manufacturing stations. At one or more of the manufacturing stations, a partially manufactured armature assembly is removed from the pallet for processing by armature handling mechanisms that may include an elevator or a pick and place mechanism, and returned to the same pallet or to an essentially identical pallet by the same handling mechanisms. The handling mechanisms must be capable of transferring the armature assemblies to the processing machines in precise positions or orientations in order to be handled by the processing machines. To simplify the tasks of the handling mechanisms, an armature assembly is positioned on a conveyor pallet in a relatively accurate location. The transverse position of an armature assembly on a pallet is generally maintained by V-shaped supports that support opposite ends of a shaft forming part of the armature assembly. However, the pallets are usually so constructed that the armature assembly can be slightly displaced, on the order of one-sixteenth of an inch or so, in the axial direction of the armature shaft. Thus, the precise axial position of the armature assembly on a pallet is not maintained. Maintenance of an armature assembly location on a pallet within about one-sixteenth of an inch is usually satisfactory and will not prevent proper processing of the armature assembly. However, carefully machined stops and other devices are often needed to hold the location of an armature assembly on a pallet within tolerance.

Electric armature assemblies have many different parameters, such as different shaft lengths, different commutator constructions or locations on their respective shafts, or different lamination stack lengths or locations on their respective shafts. A given pallet may be dedicated for use in conveying an armature assembly of only one configuration so that different pallets will have to be provided for use with armature assemblies having different configurations. Some pallets are not so limited but are provided with readily changeable armature shaft supporting members or with adjustable, i.e., axially movable and/or rotatable, armature shaft supporting members so that the pallets are usable with a wider range of armature constructions. Examples of pallets with adjustable supporting members are described in U.S. Pat. Nos. 5,346,058 and 5,348,142. These same patents show relatively complex pallets and mechanisms for adjusting the positions of the armature shaft supporting members on the pallets.

SUMMARY OF THE INVENTION

An object of this invention is to provide an inexpensive armature support pallet by which an armature assembly being manufactured may be maintained in a fixed axial position on the pallet while being conveyed from one workstation to another workstation.

Another object of this invention is to provide an inexpensive armature support pallet which is usable with armature assemblies having a substantial range of different armature configurations. More specifically, an object of this invention it to provide such a pallet which requires no changes or adjustments in order to handle armatures of different configurations. Accordingly, an armature support pallet in accordance with this invention can be used in various different armature manufacturing lines without requiring any initial set up time. If a manufacturing line is changed over from the manufacture of one armature to a different armature, the same pallet can be used, without changes or adjustments, within a large range of various different armature configurations.

In accordance with this invention, an armature assembly support pallet has a body member and a pair of mutually-spaced support assemblies mounted on the body member. The support assemblies support spaced-apart portions of an armature shaft. Each of the support assemblies includes a support member having upwardly-facing, shaft-engaging support surfaces. The support surfaces exhibit magnetic fields so that the portions of the armature shaft adjacent the support surfaces are magnetized and thereby magnetically attracted to the support surfaces.

Preferably, each of the support surfaces which exhibits a magnetic field is formed from a layer of magnetic material secured to its respective support member. In addition, the body member may have an aperture formed therein to provide access from beneath the pallet to an armature assembly carried on the pallet. If the pallet has such an aperture, the support assemblies are preferably mounted on the body member adjacent respectively opposite margins of the aperture. Also, known pallets, including those with adjustable support assemblies, may be modified or retrofitted by securing magnetic material to some or all of their support surfaces.

Other objects and advantages of this invention will become apparent from the following drawings and description.

BRIEF DESCRIPTION OF THE DRAWINGS

FIG. 3 is a partially-exploded, perspective view of an existing armature assembly support pallet that has been modified or retrofitted in accordance with this invention.

FIG. 4 is a partially-exploded perspective view similar to FIG. 3, but showing the pallet reconfigured to provide a different spacing between the supports.

DETAILED DESCRIPTION

Figure 1:
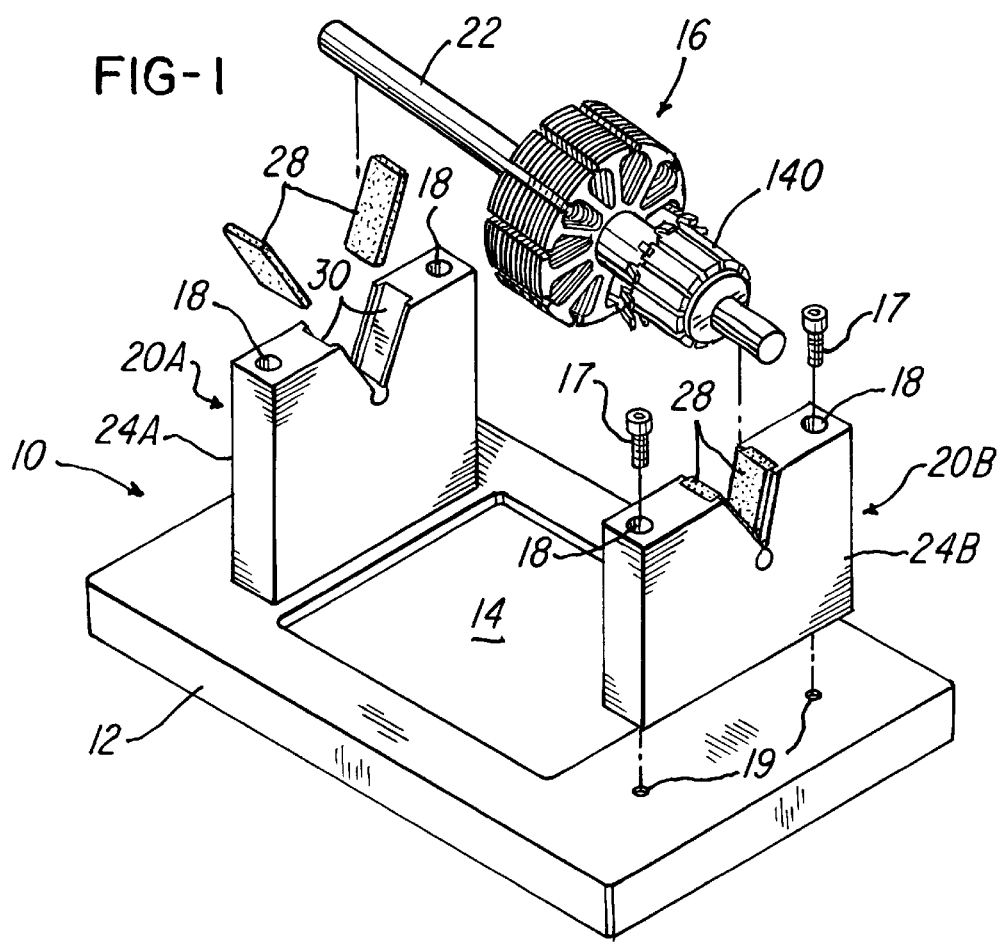
FIG. 1 is a partially-exploded, perspective view of an armature assembly support pallet in accordance with this invention and a partially-manufactured armature assembly which is carried by the pallet.

With reference to FIG. 1, a pallet, generally designated 10, in accordance with the preferred embodiment of this invention includes a body member 12 in the form of a rectangular plate having a central aperture 14. As well known to those familiar with the art, the aperture 14 provides access from beneath the pallet 10 to an armature assembly, generally designated 16, loaded on the pallet. Mutually-spaced support assemblies, generally designated 20A and 20B, which engage and support spaced-apart portions of the armature shaft 22, are mounted on the body member 12 adjacent respective opposite margins of the central aperture 14.

Figure 2:
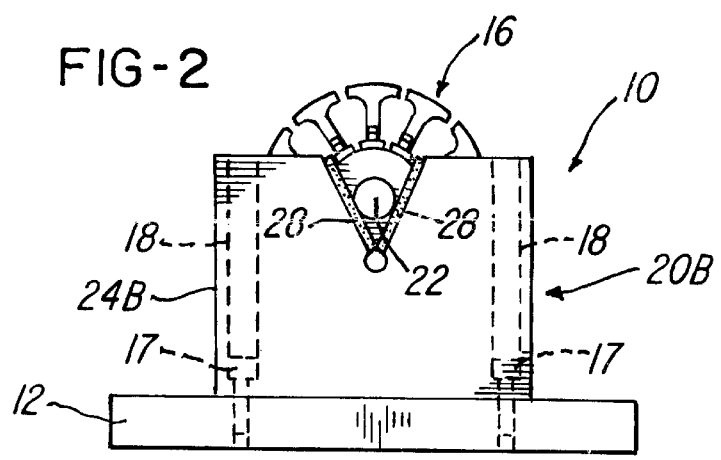
FIG. 2 is an elevational view of the armature assembly support pallet and the partially-manufactured armature assembly of FIG. 1.

Referring also to FIG. 2, each of the support assemblies 20A and 20B includes a generally rectangular nylon block or support member 24A and 24B, respectively, the top portion of which is V-shaped. Each of the support members 24A and 24B is fixedly mounted to the body member 12 by a pair of socket-headed cap screws 17 located in recesses 18 in the support members 24A and 24B. The screws 17 are threaded into tapped bores 19 in the body member 12. The support members 24A and 24B may be formed from a nylon material such as Nylatron™ GS nylon available from The Polymer Corporation, Reading, Pa. 19612. Nylatron™ GS nylon has been used to form pallet support members because it does not damage armature shafts. However, as will become apparent, wear due to contact between the armature shaft 22 and the support members 24A and 24B may be disregarded when constructing a pallet in accordance with the preferred embodiment of this invention. Therefore, the support members 24A and 24B of the pallet 10 may be formed from a less expensive, lower grade of nylon or any other suitable non-ferrous material.

It is preferred to machine straight-walled channels 30 into the support members 24A and 24B to partially receive a thin layer of magnetic material 28. The thin layer of magnetic material 28 is secured in each of the channels 30 in the V-shaped portions of the support members 24A and 24B to maintain the axial position of a supported armature assembly 16. Any commercially available magnetic material may be used, but it is presently preferred to form the layer of magnetic material 28 from a roll of flexible magnetic stripping such as magnetic stripping available from McMaster-Carr Supply Co., 600 County Line Road, Elmhurst, Ill. 60126. For reasons which will be described below the magnetic material 28 preferably projects above the channels 30.

The magnetic material 28 is preferably secured in the channels 30 using an adhesive material. Here, it will be noted that one of two manners of securing the magnetic material 28 is contemplated, although any sufficient securing method may be used. Suitable magnetic material with an adhesive backing is commercially available and can be self-adhered to the support members 24A and 24B using the adhesive backing. As an option, the back surface of the magnetic material 28 and the channels 30 may be coated with an adhesive material such as Pliabond™, available from W.J. Ruscoe Co., 483 Kenmore Boulevard, Akron, Ohio 44301. Thereafter, the coated parts are placed together, and the adhesive is permitted to cure. Although the preferred embodiment described herein includes a layer of magnetic material 28 secured to each side of the V-shaped portions of the support members 24A and 24B, it will understood that pallets in accordance with this invention may be constructed having fewer magnetic surfaces.

The layers of magnetic material 28 are engaged by the armature shaft 22 when the armature assembly 16 is carried by the pallet 10. These layers of magnetic material 28 exhibit magnetic fields that cause the portions of the armature shaft 22 adjacent the magnetic material to become at least partly magnetized in accordance with well-known physical principles. Consequently, the armature shaft 22 is magnetically attracted to the layers of magnetic material 28. Due to the attraction between the armature shaft 22 and the magnetic material 28, the armature shaft 22 will remain axially stationary as the pallet 10 is conveyed between workstations, absent any force sufficient to overcome the magnetic attraction. As is evident, the above-described construction is capable of maintaining the axial position of an armature assembly 16, regardless of the configuration of the armature assembly 16.

In addition to the magnetic restraint of the armature shaft 22, the preferred magnetic material 28 also frictionally restrains axial motion of the armature assembly 16 relative to the pallet 10. This frictional restraint is present because the preferred magnetic material 28 is formed from magnetized barium ferrite particles that are heavily interspersed throughout a soft, flexible thermoplastic material, which has a relatively high coefficient of static friction. However, it will be recognized that such frictional restraint will not be as prominent if the magnetic material has a relatively low coefficient of static friction. In such cases, it may be necessary to select a magnetic material of greater magnetic strength to achieve the desired axial restraint of the armature assembly 16. The frictional restraint is enhanced because the magnetic material 28 projects above the channels 30 so that the armature shaft 22 does not contact the nylon support members 24A and 24B, which typically will have a relatively low coefficient of static friction.

Of course, one skilled in the art will recognize that the benefits of this invention are dependent on the material from which the armature shaft 22 is formed and the strength of the magnetic field exhibited by the layers of magnetic material. For example, the greatest benefits are obtained when the material from which the armature shaft 22 is formed has a high content of ferromagnetic material. The benefits diminish as the ferrous content of the armature shaft material is reduced.

The pallet 10 shown in FIG. 1 does not rely on confronting surfaces on the support assemblies 20A and 20B and the armature assembly 16 to restrict axial movement of the armature assembly 16. Therefore, the pallet 10 in accordance with this invention may be used to support armature assemblies 16 of various sizes without adjustment. However, the range of armature assemblies 16 that may be carried by the pallet 10 is limited by the distance separating the support assemblies 20A and 20B. For example, an armature shaft 22 must have a certain minimum length to be supported by the support assemblies 20A and 20B. In addition, the maximum stack height and the maximum distance between the stack and the commutator of a supportable armature assembly 16 is also dictated by the distance between the support assemblies 20A and 20B.

Referring now to FIG. 3, a pallet, generally designated 110, of known construction is shown modified or retrofitted in accordance with this invention. The known pallet 110 comprises a pair of support assemblies, generally designated 120A and 120B mounted on the body member 112 having a central aperture 114, which may be identical to the body member 112, as described above. Both of the support assemblies 120A and 120B of the pallet 110 are adjustably mounted on the body member 112, as described below, so that they may be moved closer or farther from one another to provide a change in the range of armature configurations that may be carried on the pallet 110. The pallet 110 is modified from its original construction so that the support assembly 120B shown in FIG. 3 includes upwardly facing support surfaces formed from magnetic material 28. In this respect, the support member 124B is constructed in the same manner as the support members 24A and 24B, as described above.

The body members 124A and 124B of the support assemblies 120A and 120B, respectively, are not directly and fixedly mounted on the body member 112. Rather, mounting plates 130A and 130B, one for each body member 124A and 124B, respectively, are secured to the body member 112. The mounting plates 130A and 130B are each secured to the body member 112 by a pair of socket-headed cap screws 117 that pass through openings 118 in the mounting plates 130A and 130B and are received in the tapped bores 119. Each of the mounting plates 130A and 130B has a pair of mutually-spaced mounting pins 132A and 132B, respectively, extending upwardly therefrom between the openings 118.

With further reference to FIG. 3, the support member 124A that forms part of the support assembly 120A includes three axially-spaced pairs of laterally-spaced apertures 134 that extend upwardly from the bottom surface of the support member 124A. Each pair of apertures 134 is so spaced and dimensioned that the support member 124A may be positioned above the mounting plate 130A to align any one of the pairs of laterally-spaced apertures 134 with the mounting pins 132A. To mount the support member 124A on the mounting plate 130A, the support member 124A is lowered with a pair of the apertures 134 aligned with the pins 132A so that the pins 132A are snugly received in the apertures 134.

The support member 124A may be removed from the pins 132A and moved axially to another position wherein another pair of apertures 134 is aligned with the pins 132A so that the pins are received in the other pair of apertures 134. By so moving the support member 124A, it may be moved closer to or farther from the center of the pallet 110 to accommodate different armature configurations. The support member 124A also includes a stop pin 136 projecting upwardly in the V-shaped portion of the support member 124A. The stop pin 136 serves to limit axial motion of a supported armature assembly 16 in the direction of the support member 124A.

Again referring to FIG. 3, the support member 124B has a single pair of laterally-spaced apertures 134B formed therein that extend upwardly from the bottom surface of the support member 124B. As with the support member 124A, the apertures 134B are spaced apart so that they may be aligned with the mounting pins 132B. The support member 124B is mounted on the mounting plate 130B, plate 130B being secured to the body member 112, by aligning the pair of apertures 134B with the pins 132B and lowering the support member 124B so that the pins 132B are snugly received in the apertures 134B. So that the support member 124B is readily adjustable, the pair of apertures 134B is offset toward the face 138 of the support member 124B. The support member 124B may be mounted on the pins 132B in one of two different orientations, depending on the direction in which the face 138 faces. The support member 124B is reoriented by removing the support member 124B from the pins 132B and remounting the support member 124B on the pins 132B so that the face 138 faces in the opposite direction, as shown in FIG. 4. Due to the off-center nature of the apertures 134, such reorientation locates the support member 124B either closer or farther from the center of the pallet 110.

In many instances, the armature assembly 16 is loaded onto the pallet 110 with the commutator 140 (FIG. 1) in contact with the support member 124B, which limits axial movement of the armature assembly 16 toward the support member 124B. In such instances, axial movement of an armature assembly 16 carried on the pallet shown in FIG. 3 is limited in one direction by engagement of the stop pin 136 with the armature shaft 22 and in the other direction by engagement of the commutator 140 with the support member 124B. Thus, no magnetic material 28 is needed to maintain the axial position of the armature assembly 16. However certain situations require the armature assembly 16 to be carried on the pallet 110 before the commutator 140 is placed on the shaft 22. In such situations, the armature assembly is free to move axially in the direction of the support member 124B. Therefore, the pallet 110 may be modified or retrofitted in accordance with this invention, as shown in FIG. 3, to include support surfaces formed from a layer of magnetic material 28 secured to the support member 124B to prevent axial movement of the armature assembly 16 (without a commutator 140) in the direction of the support member 124B. If the magnetic material 28 is secured to the support member 124B, channels are preferably formed in the support member 124B and the magnetic material is secured in the channels as described above regarding support member 24A and 24B.

It will be recognized that the mounting and adjustment procedures described above for support members 124A and 124B may be used for support members of other configurations. For example, the support members may be L-shaped or may have various different numbers of pairs of apertures formed therein. In addition, pallets may be constructed so that both of the support assemblies are fixed or so that both are adjustable as described above. If only one support assembly is adjustable, it may be adjustable by removal and axial movement, as the support member 124A, or by removal and replacement as described above with respect to either the support member 124A or the support member 124B. If both support assemblies are adjustable as shown in FIGS. 3 and 4, they may each be adjustable by removal and replacement as described above with respect to either the support member 124A or the support member 124B.

Although the presently preferred embodiments of this invention have been described, it will be understood that within the purview of the invention various changes may be made within the scope of the following claims.

Having thus described my invention, I claim:

1. An armature assembly support pallet for use during the manufacture of an armature assembly having an armature shaft, comprising:
    a body member; and
    a pair of mutually-spaced support assemblies mounted on said body member each comprising a support member having at least one upwardly-facing, shaft-engaging support surface, at least one of said support surfaces being magnetic so that a portion of an armature shaft if located adjacent said magnetic support surface would be magnetically attracted thereto, said at least one magnetic support surface comprising a layer of magnetic material secured to its respective support member.

2. The support pallet of claim 1 wherein at least one of said support surfaces on each of said support assemblies is magnetic and wherein each of said magnetic support surfaces comprises a layer of magnetic material secured to its respective support member.

3. The support pallet of claim 1 wherein all of said support surfaces are magnetic and wherein each of said magnetic support surfaces comprises a layer of magnetic material secured to its respective support member.

4. An armature assembly support pallet for use during the manufacture of an armature assembly having an armature shaft, comprising:
    a body member; and
    a pair of mutually-spaced support assemblies mounted on said body member each comprising a support member having at least one upwardly-facing, shaft-engaging support surface, at least one of said support surfaces being magnetic so that a portion of an armature shaft if located adjacent said magnetic support surface would be magnetically attracted thereto, said at least one of said support surfaces being located on only one of said support assemblies.

5. In an armature assembly support pallet comprising a body member and a mutually-spaced pair of support members mounted on said body member, said support members having upwardly-facing support surfaces, the improvement wherein at least one of said support surfaces comprises a layer of magnetic material secured to its respective support member.

6. The improvement of claim 5 wherein each of said support surfaces comprises a layer of magnetic material secured to its respective support member.

7. In an armature assembly support pallet comprising a body member and a mutually-spaced pair of support members mounted on said body member, said support members having upwardly-facing support surfaces, the improvement wherein at least one of said support surfaces comprises magnetic material secured to its respective support member.

8. The improvement of claim 7 wherein each of said support surfaces comprises magnetic material secured to its respective support member.

* * * * *